(12) United States Patent
Melas

(10) Patent No.: US 6,404,831 B1
(45) Date of Patent: Jun. 11, 2002

(54) DATA DETECTION WITH DIGITAL FILTER DETECTOR

(75) Inventor: Constantin Michael Melas, Los Gatos, CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/167,728

(22) Filed: Oct. 7, 1998

(51) Int. Cl.[7] .................................................. H04B 1/10
(52) U.S. Cl. ......................................... 375/350; 360/51
(58) Field of Search ................................. 375/350, 345, 375/355, 377, 316, 229, 232, 231, 233, 230, 340, 290, 376; 341/143; 360/51

(56) References Cited

U.S. PATENT DOCUMENTS

| | | | |
|---|---|---|---|
| 5,089,822 A | * | 2/1992 | Abaunza et al. |
| 5,220,570 A | | 6/1993 | Lou et al. |
| 5,265,125 A | | 11/1993 | Ohta |
| 5,321,559 A | | 6/1994 | Nguyen et al. |
| 5,345,342 A | | 9/1994 | Abbott et al. |
| 5,410,556 A | | 4/1995 | Yeh et al. |
| 5,420,893 A | | 5/1995 | Ward |
| 5,422,894 A | | 6/1995 | Abe et al. |
| 5,424,881 A | | 6/1995 | Behrens et al. |
| 5,440,572 A | * | 8/1995 | Kitaori |
| 5,481,568 A | | 1/1996 | Yada |
| 5,541,960 A | | 7/1996 | Satomura et al. |
| 5,602,858 A | * | 2/1997 | Kitaori |
| 5,937,020 A | * | 8/1999 | Hase et al. .................. 375/376 |

* cited by examiner

Primary Examiner—Jean Corrielus
(74) Attorney, Agent, or Firm—Morgan & Finnegan, LLP

(57) ABSTRACT

The present invention is a data detection channel with improved detection reliability and better immunity to signal dropout and noise, that has reduced data redundancy. The data detection channel includes a preamp/filter, a sample/quantizer, an equalizer, a timing recovery circuit and a digital detection filter. The digital detection filter includes a finite impulse response filter, a synchronization and windowing device and a data detection circuit. The a finite impulse response filter has a plurality of coefficients and stores a plurality of channel data samples. On each cycle of the sampling clock, the finite impulse response filter is operable to input and store a channel data sample and output a sum signal representing a sum of each product of each coefficient multiplied by a corresponding stored channel data sample. The synchronization and windowing device is operable to receive the sum signal each sampling clock cycle and output the sum signal, if it corresponds to a symbol. The data detection circuit is operable to receive a sum signal that corresponds to a symbol and outputting digital data represented by the symbol.

24 Claims, 5 Drawing Sheets

Fig. 4

| FILTERS | SYNCHRONIZATION FIELD | | | | | | | | | | START FIELD | | | | | |
|---|---|---|---|---|---|---|---|---|---|---|---|---|---|---|---|---|
| | 1 | 1 | -1 | -1 | 1 | 1 | -1 | -1 | 1 | 1 | 0 | 0 | -1 | -1 | 1 | 1 |
| 402  +1 +1 | | +2 | | | | +2 | | | | +2 | | | | -2 | | |
| 404  -1 +1 +1 -1 | | | | | | | +4 | | | | +3 | | | | -3 | |
| 406  -1 -1 +2 +2 -1 -1 | | | | | | | | +8 | | | | +6 | | | | -6 |

DATA DETECTION WITH DIGITAL FILTER DETECTOR

FIELD OF THE INVENTION

The present invention relates to data detection with improved reliability using a digital filter detector, and in particular to data detection using a digital filter matched to the data to be detected.

BACKGROUND OF THE INVENTION

In digital magnetic detection, the signal is sampled every bit period, and each sample is detected as a binary symbol. Traditionally, greater data transfer reliability is achieved by adding redundancy to the data. For example, if the same byte is repeated three times, it will be detected correctly, by majority vote, if just two of the three bytes are error free.

Data reliability is always important, no matter what the data being detected. However, the reliability of certain data is of even greater importance. For example, the detection of the start of a record, on a magnetic tape, or a sector address, on a magnetic disk drive, is crucial to the detection of the data in the record or sector. The beginning of the record is marked by a START or SYNCHRONIZATION word, which must be detected much more reliably than is necessary for the remaining data. Errors in the remaining data can be corrected by error correction codes, but only if the start of the record is accurately detected. Similarly, when a seek is performed for a disk sector, an error in the sector address prevents finding of the sector.

Conventional schemes for improving the reliability of start of record words or sector addresses involve assigning redundant bits to the start word or sector address. However, the reliability of conventional schemes is dependent upon the limitations of the detection system. For example, a partial response maximum likelihood (PRML) detector will fail if the signal amplitude is reduced by half, no matter how much redundancy is used in the data. A need arises for a technique by which the reliability of detection of important data can be improved to provide better immunity to signal dropout and noise, with reduced data redundancy.

SUMMARY OF THE INVENTION

The present invention is a data detection channel with improved detection reliability and better immunity to signal dropout and noise, that has reduced data redundancy. The data detection channel includes a preamp/filter, a sample/quantizer, an equalizer, a timing recovery circuit and a digital detection filter. The preamp/filter is operable to receive an analog signal representing digital data and output an amplified and filtered analog signal. The sample/quantizer is coupled to the amplified and filtered analog signal and is operable to sample and quantize the analog signal to form a digital sample stream. The equalizer is coupled to the digital sample stream and is operable to equalize the digital sample stream to form a channel data stream comprising a sequence of channel data samples. The timing recovery circuit is coupled to the channel data stream and is operable to recover timing information to form a sampling clock. The digital detection filter is coupled to the channel data stream and the sampling clock and is operable to detect and output the digital data.

The analog signal represents a digital signal comprising a plurality of symbols, each symbol comprising a sequence of values, each symbol representing a unit of digital data. The digital detection filter includes a finite impulse response filter, a synchronization and windowing device and a data detection circuit. The finite impulse response filter has a plurality of coefficients and stores a plurality of channel data samples. On each cycle of the sampling clock, the finite impulse response filter is operable to input and store a channel data sample and output a sum signal representing a sum of each product of each coefficient multiplied by a corresponding stored channel data sample. The synchronization and windowing device is operable to receive the sum signal each sampling clock cycle and output the sum signal, if it corresponds to a symbol. The data detection circuit is operable to receive a sum signal that corresponds to a symbol and output digital data represented by the symbol.

In one embodiment of the present invention, the finite impulse response filter has a number of coefficients equal to a number of values of a symbol. In this embodiment, the coefficients are matched to a sequence of values of a symbol.

In another embodiment of the present invention, the finite impulse response filter has a number of coefficients fewer than a number of values of a symbol. In this embodiment, the coefficients are matched to a portion of a sequence of values of a symbol.

In another embodiment of the present invention, the finite impulse response filter has a number of coefficients greater than a number of values of a symbol. In this embodiment, the coefficients are matched to a sequence of values including a symbol.

BRIEF DESCRIPTION OF THE DRAWINGS

The details of the present invention, both as to its structure and operation, can best be understood by referring to the accompanying drawings, in which like reference numbers and designations refer to like elements.

FIG. 1b is an exemplary block diagram of a digital detection filter shown in FIG. 1a.

FIG. 4 shows an example of the output of a matched filter, and two alternative filters, for input samples consistent with PR4 equalization and constraints.

DETAILED DESCRIPTION OF THE INVENTION

Figure 1A:
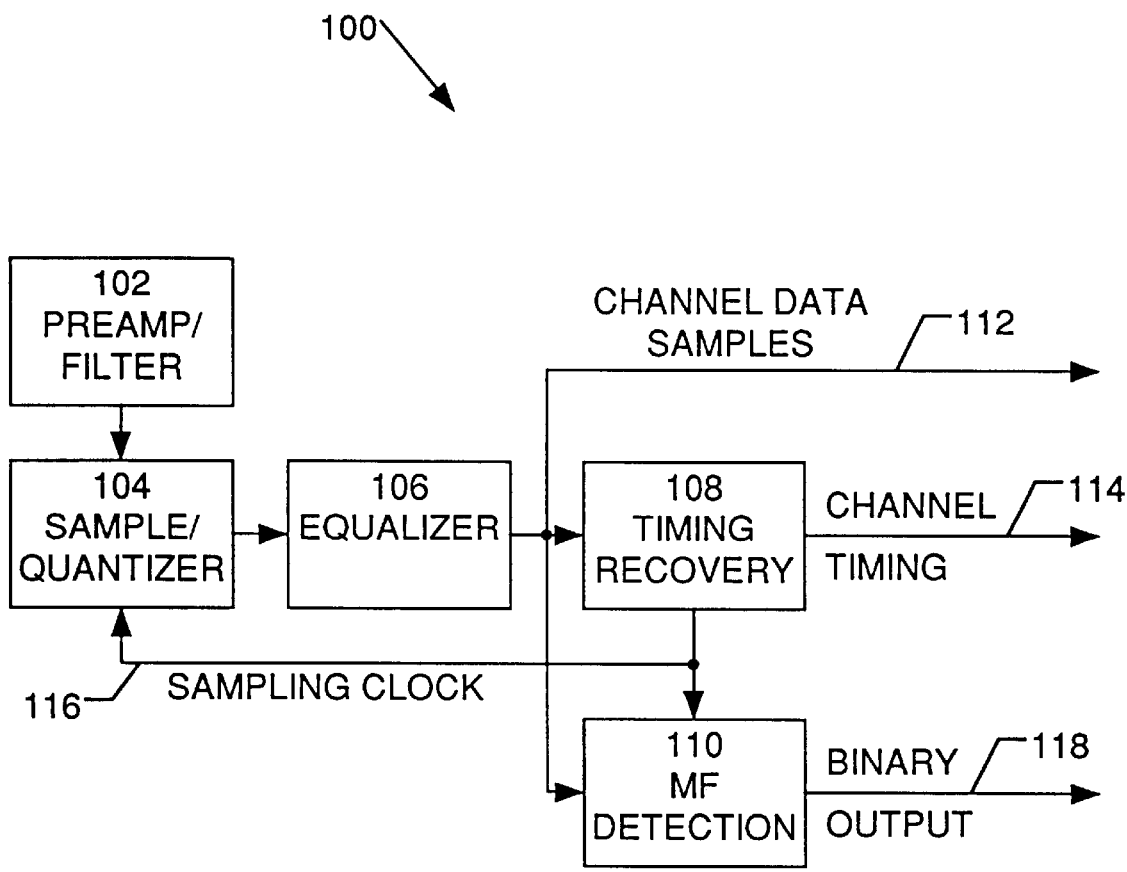
FIG. 1a is an exemplary block diagram of an data detection channel 100, according to the present invention.

A block diagram of an exemplary data detection channel 100, according to the present invention, is shown in FIG. 1a. Channel 100 is representative of a data detection channel suitable for use in, for example, a magnetic tape drive, a magnetic disk drive data path, or a magnetic disk drive servo path. Channel 100 includes preamp/filter 102, sample/quantizer 104, equalizer 106, timing recovery circuit 108 and digital detection filter 110. Preamp/filter 102 receives an analog signal from magnetic read heads (not shown), which read the signal from the tape or disk medium. The analog signal represents a digital signal, which, in turn, represents digital data. Preamp/filter 102 amplifies and filters the analog signal and outputs the signal to sample/quantizer 104. Sample/quantizer 104 samples and quantizes the analog signal and outputs a digital signal representative of the analog signal. In some applications, the analog signal is quantized to only one bit per sample, while in other applications, multi-bit samples are generated. Equalizer 106 is typically a digital filter, which equalizes the digital signal according to a standard characteristic, such as Partial Response Class IV (PR4) or extended partial response class 4 (EPR4). The equalized digital signal is a stream of digital samples termed channel data samples 112.

The channel data samples are input to timing recovery circuit 108, which recovers timing information from the samples and generates a channel timing signal 114 and a sampling clock 116. The sampling clock is input to sample/quantizer 104, and serves as a timing reference for sampling and quantizing the analog signal. The channel data samples are input to digital detection filter 110, which generates binary output 118. The channel data samples 112 are also output to a conventional data detection circuit (not shown).

Figure 1B:
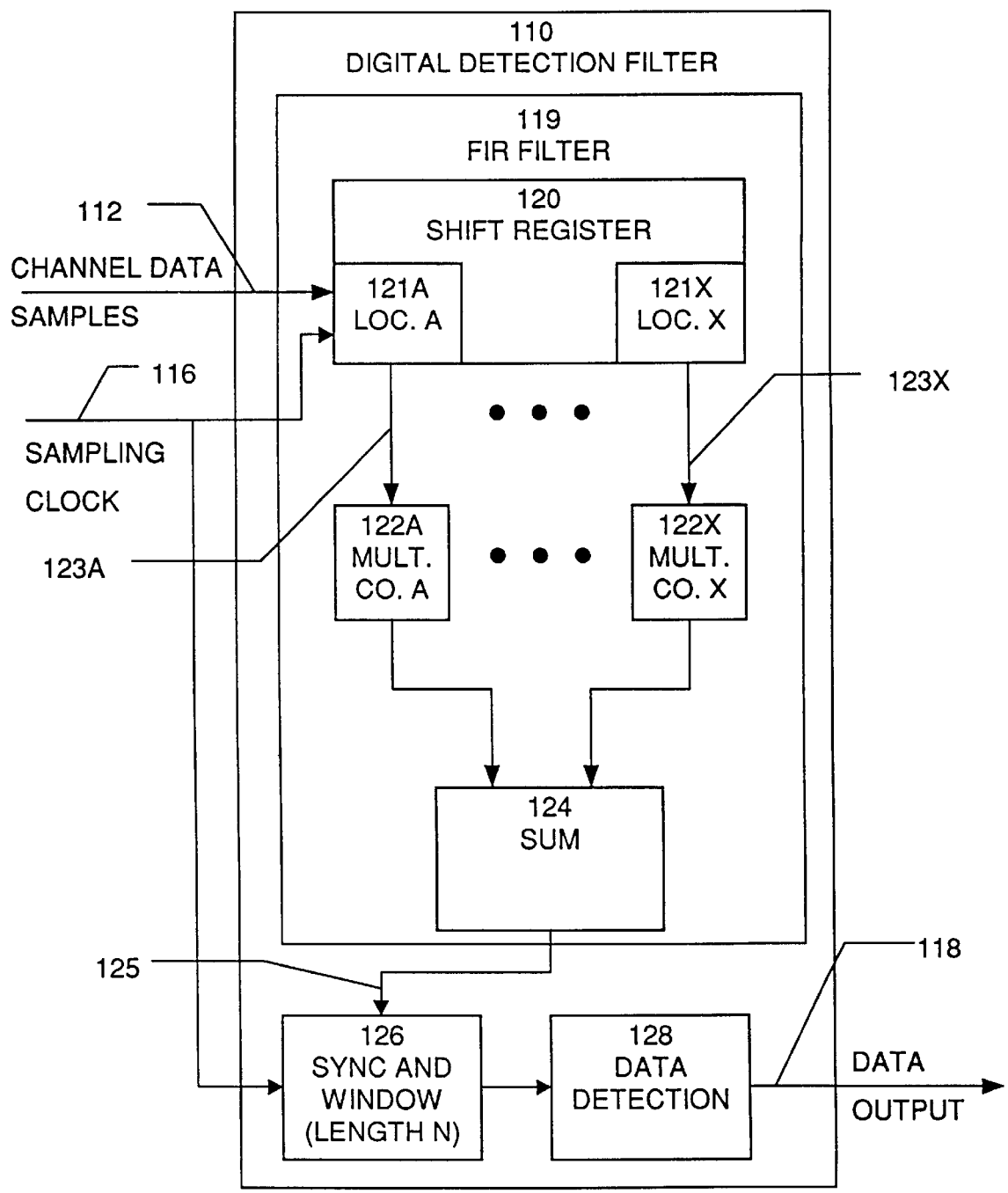

Digital detection filter 110 includes a finite impulse response digital filter 119, which has a fixed length of operation, x. An exemplary block diagram of digital detection filter 110 is shown in FIG. 1b. Digital detection filter 110 includes shift register 120, which has x storage locations 121A–X, x multipliers 122A–X, and summing circuit 124. Shift register 120 may be a single bit in width, for processing one bit samples, or shift register 120 may be multiple bits in width, for processing multi-bit samples. Each storage location, such as location 121A, has an output, such as output 123A, which is the appropriate size to output the sample in the storage location. Shift register 120 receives channel data samples 112, shifting in one new sample for each cycle of sampling clock 116. The newest sample in shift register 120 is stored in storage location 121A and the oldest sample is stored in storage location 121X. Each cycle of the sample clock, a new sample is shifted in, the oldest sample is shifted out, and the remaining samples are shifted by one storage location.

Each sample stored in shift register 120 is output to one of the multipliers 122A–X. Each multiplier multiplies the input sample by a predetermined coefficient. The outputs of all the multipliers are input to summing circuit 124, which sums the values and outputs a representative sum signal 125 to sync and window circuit 126. The sum signal is typically a multi-bit signal.

FIR filter 119 operates on x data samples to generate an output value. Each time the next channel data sample is input, FIR filter 119 generates a new output value. However, the output value is only used each time a complete symbol has been processed. Sync and window circuit 126 detects synchronization information in the channel data samples and synchronizes to this information. Circuit 126 synchronizes a window to the symbol length, length n, so that binary output 118 represents valid symbols. Circuit 126 thus outputs only those values from the FIR filter that correspond to symbols. For example, if the symbol length n=4, circuit 126 only outputs the value from FIR filter 119 every four sample clocks, starting four samples clocks after the synchronization information is detected. Data detection circuit 128 receives the FIR filter values that correspond to symbols and outputs the digital data represented by each symbol.

The digital data processed by digital detection filter 110 is essentially a sequence of numbers, of one or more bits each. A finite impulse response (FIR) digital filter of length x, such as digital detection filter 110, takes x consecutive numbers, multiplies each number by one of a set of x coefficients, and outputs the sum of the products. The filter is defined by the ordered set of coefficients. For example, consider the digital data sequence [1 2 0 3 2 1], ordered in time, with the first number of the sequence occurring first in time. Also, consider an FIR filter defined by the set of coefficients {3 2 1}. The output from the filter, as the sequence is processed, is shown in Table A:

TABLE A

| Portion of Sequence Processed | Multiplier with coeff. 3 | Multiplier with coeff. 2 | Multiplier with coeff. 1 | Output (sum of multipliers) |
| --- | --- | --- | --- | --- |
| 1 2 0 | 1 × 3= 3 | 2 × 2= 4 | 0 × 1= 0 | 3 + 4 + 0= 7 |
| 2 0 3 | 2 × 3= 6 | 0 × 2= 0 | 3 × 1= 3 | 6 + 0 + 3= 9 |
| 0 3 2 | 0 × 3= 0 | 3 × 2= 6 | 2 × 1= 2 | 0 + 6 + 2= 8 |
| 3 2 1 | 3 × 3= 9 | 2 × 2= 4 | 1 × 1= 1 | 9 + 4 + 1= 14 |

Thus, the binary output sequence that results is [7 9 8 14]. The last binary output is 14, which is the sum of the squares of the input sequence [3 2 1]. Thus, the filter having coefficients {3 2 1} is defined as matched to the sequence [3 2 1]. The filter is matched to either positive or negative sequences, and the sign of the sequence is preserved. If the input sequence was [−3−2−1], the output would be −14.

In a preferred embodiment, digital detection filter 110 is a matched filter. Digital detection filter 110 is termed matched to a particular symbol if the length x, of FIR filter 119, is equals the symbol length n, of the symbols to be detected, and if the coefficients of FIR filter 119 match the symbol values. A filter matched to a particular positive sequence will also be matched to a sequence that is the same, but with negative sign. Thus, when a matched filter detects a symbol to which it is matched, the output of the filter is the sum of the squares of the symbol values, with either positive or negative sign. This allows detection of two symbols with equal reliability.

Although an embodiment in which digital detection filter 110 is a matched filter is preferred, it is important to understand that the present invention contemplates filters that are not matched as well. For example, the symbol length n and the FIR filter length x need not be the same. Increasing the symbol length improves data transfer reliability, at the cost of reduced data transfer rate. Increasing the FIR filter length improves dropout and noise immunity, at the cost of increased circuit complexity and expense. The FIR filter 119 is matched to the symbol length if the number of filter coefficients, x, is the same as the length of the symbol, n. Furthermore, the FIR filter 119 is a matched filter if it is matched to the symbol length and the symbol pattern.

A matched filter is a preferred embodiment of the present invention, but the present invention is not limited to that embodiment. Instead, the present invention contemplates embodiments in which the symbol length is longer than the filter length, as well as embodiments in which the symbol length is shorter than the filter length. Thus, in this document, any reference to a matched filter is equally applicable to the unmatched embodiments as well.

In order to represent data to be detected by the digital detection filter, two symbols, Symbol 1 and Symbol 0, are defined. Symbol 1 is represented by a sequence of n values, while Symbol 0 is represented by the same sequence with opposite sign. Using the example shown in Table A, Symbol 1=[3 2 1] and Symbol 0=[−3−2−1]. In order to detect these symbols, the filter is matched to the sequences representing the symbols. Thus, the coefficients of the matched filter are {3 2 1}. The output corresponding to Symbol 1 is 14 and the output corresponding to Symbol 0 is −14. However, the sequences in this example do not achieve maximum noise immunity. In order to maximize the noise immunity, maximum separation between Symbol 1 and Symbol 0 must be obtained. This is achieved by selecting the representative sequences and the matching filter coefficients to maximize the sum of the squares of the values. For example, for example, using sequences where the maximum sample value is 3, Symbol 1=[3 3 3], Symbol 0=[−3−3−3] and matched filter coefficients of {3 3 3}, would produce and output corresponding to Symbol 1 of 27 and an output corresponding to Symbol 0 of −27.

In a preferred embodiment, the present invention may be applied to a Partial Response Class IV (PR4) channel. In PR4, only three sample values are used: 0, +1, and −1, with the constraint that 1's in alternate positions must be of opposite sign. For example, the sequence [+1−1+1+1] is invalid because the 1's in the first and third positions are of the same sign. The sequence [+1+1−1−1] is valid because the 1's in the first and third positions are of opposite sign and the 1's in the second and fourth positions are of opposite sign.

In order to maximize the sum of the squares, the sequences representing Symbol 1 and Symbol 0 are chosen to include only sample values of +1 and −1. For example, with length n=4, optimum choices would be Symbol 1=[+1+1−1−1] and Symbol 0=[−1−1+1+1]. Unfortunately, Symbol 1 followed by Symbol 0 yields and invalid sequence [+1+1−1−1−1−1+1+1] (the third and fifth and fourth and sixth samples have the same sign). This is fixed by defining the sequence representing a Symbol 1 followed by a Symbol 0 to be [+1+1−1 0 0−1+1+1 ].

For even values of n greater than 2, symbols chosen according to the following rules are valid: A Symbol 1 preceded and followed by another Symbol 1 is assigned the sequence [−1−1+1+1 . . . ] or [+1−1−1+1 . . . ]. If a Symbol 1 is preceded by a Symbol 0, the first sample value in the Symbol 1 sequence is changed to a 0: [0−1+1+1 . . . ] or [0−1−1+1 . . . ]. If a Symbol 1 is followed by a Symbol 0, the last sample value is changed to a 0. A Symbol 0, which is assigned a sequence of [−1−1+1+1 . . . ] or [−1+1+1−1 . . . ], follows the same rules.

For odd values of n greater than 1, symbols chosen according to the following rules are valid: Symbol 1 is assigned the sequence [+1+1−1−1+1 . . . ]. Either the first or second sample value is changed to 0, depending on the previous symbol. Symbol 0 is assigned the sequence [−1+1+1 . . . ] and follows the same rules.

Any data may be detected using the present invention. However, the present invention is particularly useful with data which require improved reliability. For example, start of record information, sector address and servo tracks may, in particular, be advantageously detected using the present invention.

Figure 2:
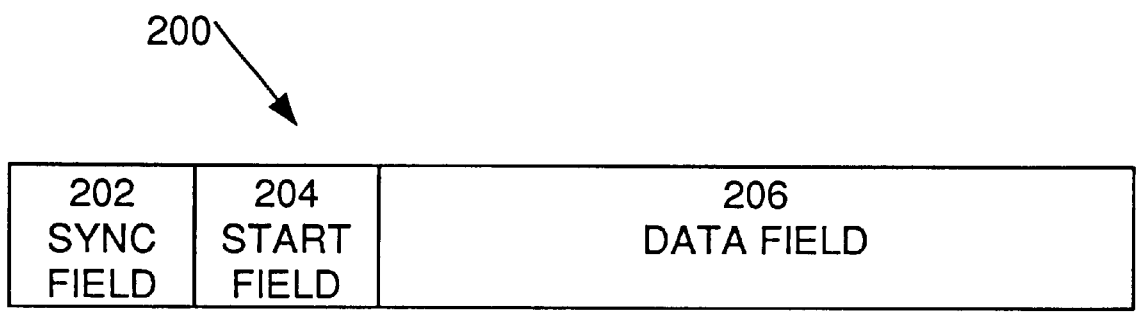
FIG. 2 is an exemplary format of a data record, according to a preferred embodiment of the present invention.

An exemplary format of a data record 200, according to a preferred embodiment of the present invention, is shown in FIG. 2. Data record 200 includes synchronization field 202, start field 204 and data field 206. Synchronization field 202 contains a synchronization pattern, typically a series of Symbol 1's, which synchronizes timing recovery circuit 108 to the correct phase (bit sync). Start field 204 contains Symbol 0, which marks the start of data field 206. The format shown in FIG. 2 may also be used for a sector address or a servo track.

Figure 3:
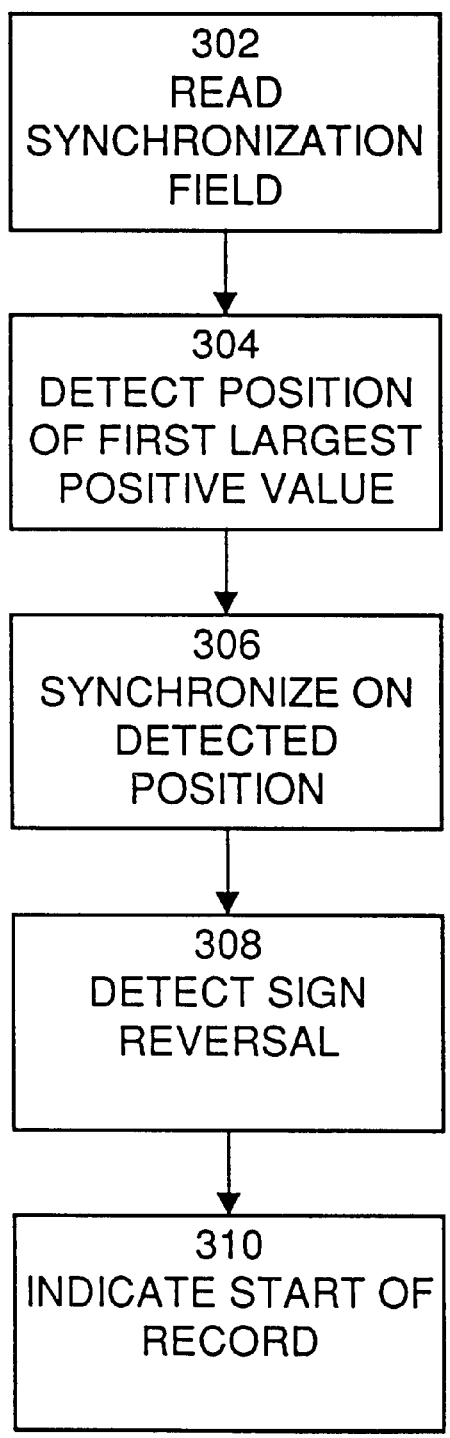
FIG. 3 is a flow diagram of a start of record detection process, according to a preferred embodiment of the present invention.

A flow diagram of a start of record detection process, according to a preferred embodiment of the present invention, is shown in FIG. 3. It is best viewed in conjunction with FIG. 4, which shows the output of a matched filter, and two alternative filters, for input samples consistent with PR4 equalization and constraints. Filter 402 is a filter having a length shorter than the symbol length, filter 404 is a matched filter, and filter 406 has a length longer than the symbol length.

The process begins with step 302, in which the synchronization field is read. The synchronization field consists of the repeated sequence [+1+1−1−1]. The FIR filter shifts in another sample in the sequence and outputs a value each cycle of the sampling clock. In step 304, the position of the first largest positive value is detected. This is shown in FIG. 4, as the first value in each row. For example, filter 402 has coefficients {+1+1}. The largest possible positive value that may be output from this filter is +2. The position of the first occurrence of +2 is detected. Likewise, for filter 404, which has coefficients {−1+1+1−1}, the largest possible value is +4, and for filter 406, which has coefficients {−1−1+2+2−1−1}, the largest possible value is +8. In each case, the position of the first occurrence of the largest possible value is detected.

In step 306, the symbol window is synchronized to the detected position. In each filter shown in FIG. 4, the length of the symbols being detected is four samples. Thus, there are four samples between outputs from the FIR filter that may correspond to a symbol. When the first occurrence of the largest possible value is detected, the next possible output corresponding to a symbol occurs four samples later, and every four samples thereafter. The symbol window allows only the values from the FIR filter that correspond to symbols to be output. Thus, in this example, the symbol window opens only every four samples.

In step 308, a sign reversal in the output is detected. This sign reversal indicates that the start field, which contains a Symbol 0, has been processed. For example, in FIG. 4, the matched detector with filter 402 outputs +2 followed by −2. Likewise, the matched detector with filter 404 outputs +3 followed by −3 and the matched detector with filter 406 outputs +6 followed by −6. In step 310, the start of record is indicated.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A data detection channel, comprising:
    a preamp/filter operable to receive an analog signal representing digital data and output an amplified and filtered analog signal;
    a sample/quantizer, coupled to the amplified and filtered analog signal, operable to sample and quantize the analog signal to form a digital sample stream;
    an equalizer, coupled to the digital sample stream, operable to equalize the digital sample stream to form a channel data stream comprising a sequence of channel data samples;
    a timing recovery circuit, coupled to the channel data stream, operable to recover timing information to form a sampling clock; and
    a digital detection filter, coupled to the channel data stream and the sample clock, operable to detect and output the digital data, wherein the digital detection filter further includes a finite impulse response filter communicatively coupled to a synchronization and a windowing device.

2. The data detection channel of claim 1, wherein the analog signal represents a digital signal comprising a plurality of symbols, each symbol comprising a sequence of values, each symbol representing a unit of digital data, and wherein said finite impulse response filter further includes a plurality of coefficients and storing a plurality of channel data samples, operable to, on each cycle of the sampling clock, input and store a channel data sample and output a sum signal representing a sum of each product of each coefficient multiplied by a corresponding stored channel data sample, and said synchronization and windowing device is operable to receive the sum signal each sampling clock cycle and output the sum signal, if said sum signal corresponds to a said symbol, and said digital detection filter further including a data detection circuit operable to receive said sum signal that corresponds to a said symbol and outputting digital data represented by the symbol.

3. The data detection channel of claim 2, wherein the finite impulse response filter has a number of coefficients equal to a number of values of a symbol.

4. The data detection channel of claim 3, wherein the coefficients are matched to a sequence of values of a symbol.

5. The data detection channel of claim 2, wherein the finite impulse response filter has a number of coefficients fewer than a number of values of a symbol.

6. The data detection channel of claim 5, wherein the coefficients are matched to a portion of a sequence of values of a symbol.

7. The data detection channel of claim 2, wherein the finite impulse response filter has a number of coefficients greater than a number of values of a symbol.

8. The data detection channel of claim 3, wherein the coefficients are matched to a sequence of values including a symbol.

9. A data detection channel comprising:

means for receiving an analog signal representing digital data and outputting an amplified and filtered analog signal;

means, coupled to the amplified and filtered analog signal, for sampling and quantizing the analog signal to form a digital sample stream;

means, coupled to the digital sample stream, for equalizing the digital sample stream to form a channel data stream comprising a sequence of channel data samples;

means, coupled to the channel data stream, for recovering timing information to form a sampling clock; and means, coupled to the channel data stream and the sampling clock, for detecting and outputting the digital data, said detecting and outputting means further including means for inputting and storing said channel data sample and outputting a sum signal.

10. The data detection channel of claim 9, wherein the analog signal represents a digital signal comprising a plurality of symbols, each symbol comprising a sequence of values, each symbol representing a unit of digital data, and wherein said means for inputting and storing said channel data sample further includes a plurality of coefficients and storing a plurality of channel data samples, for, on each cycle of the sampling clock, inputting and storing said channel data sample and outputting said sum signal representing a sum of each product of each coefficient multiplied by a corresponding stored channel data sample, and said detecting and outputting means further including: (1) means for receiving the sum signal each sampling clock cycle and outputting the sum signal, if said sum signal corresponds to a said symbol, and (2) means for receiving said sum signal that corresponds to a said symbol outputting digital data represented by the symbol.

11. The data detection channel of claim 10, wherein the means for inputting and storing a channel data sample and outputting a sum signal has a number of coefficients equal to a number of values of a symbol.

12. The data detection channel of claim 11, wherein the coefficients are matched to a sequence of values of a symbol.

13. The data detection channel of claim 10, wherein the means for inputting and storing a channel data sample and outputting a sum signal has a number of coefficients fewer than a number of values of a symbol.

14. The data detection channel of claim 13, wherein the coefficients are matched to a portion of a sequence of values of a symbol.

15. The data detection channel of claim 10, wherein the means for inputting and storing a channel data sample and outputting a sum signal has a number of coefficients greater than a number of values of a symbol.

16. The data detection channel of claim 15, wherein the coefficients are matched to a sequence of values including a symbol.

17. A method for detecting data, comprising the steps of:

receiving an analog signal representing digital data and outputting an amplified and filtered analog signal;

sampling and quantizing the analog signal to form a digital sample stream;

equalizing the digital sample stream to form a channel data stream comprising a sequence of channel data samples;

recovering timing information to form a sampling clock; and detecting and outputting the digital data using the channel data stream and the sampling clock, wherein a plurality of said channel data samples are stored, and the channel data sample from said sequence is inputted and stored on each cycle of the sampling clock, and a sum signal output is transmitted.

18. The method of claim 17, wherein the analog signal represents a digital signal comprising a plurality of symbols, each symbol comprising a sequence of values, each symbol representing a unit of digital data, and the detecting and outputting step further comprises the steps of:

providing a plurality of coefficients;

configuring the sum signal to represent a sum of each product of each coefficient multiplied by a corresponding stored channel data sample;

receiving the sum signal each sampling clock cycle and outputting the sum signal, if said sum signal corresponds to a symbol; and receiving a sum signal that corresponds to a said symbol and outputting digital data represented by the symbol.

19. The method of claim 18, wherein the plurality of coefficients has a number of coefficients equal to a number of values of a symbol.

20. The method of claim 19, wherein the coefficients are matched to a sequence of values of a symbol.

21. The method of claim 18, wherein the plurality of coefficients has a number of coefficients fewer than a number of values of a symbol.

22. The method of claim 21, wherein the coefficients are matched to a portion of a sequence of values of a symbol.

23. The method of claim 18, wherein the plurality of coefficients has a number of coefficients greater than a number of values of a symbol.

24. The data detection channel of claim 23, wherein the coefficients are matched to a sequence of values including a symbol.

* * * * *